Patented Jan. 5, 1937

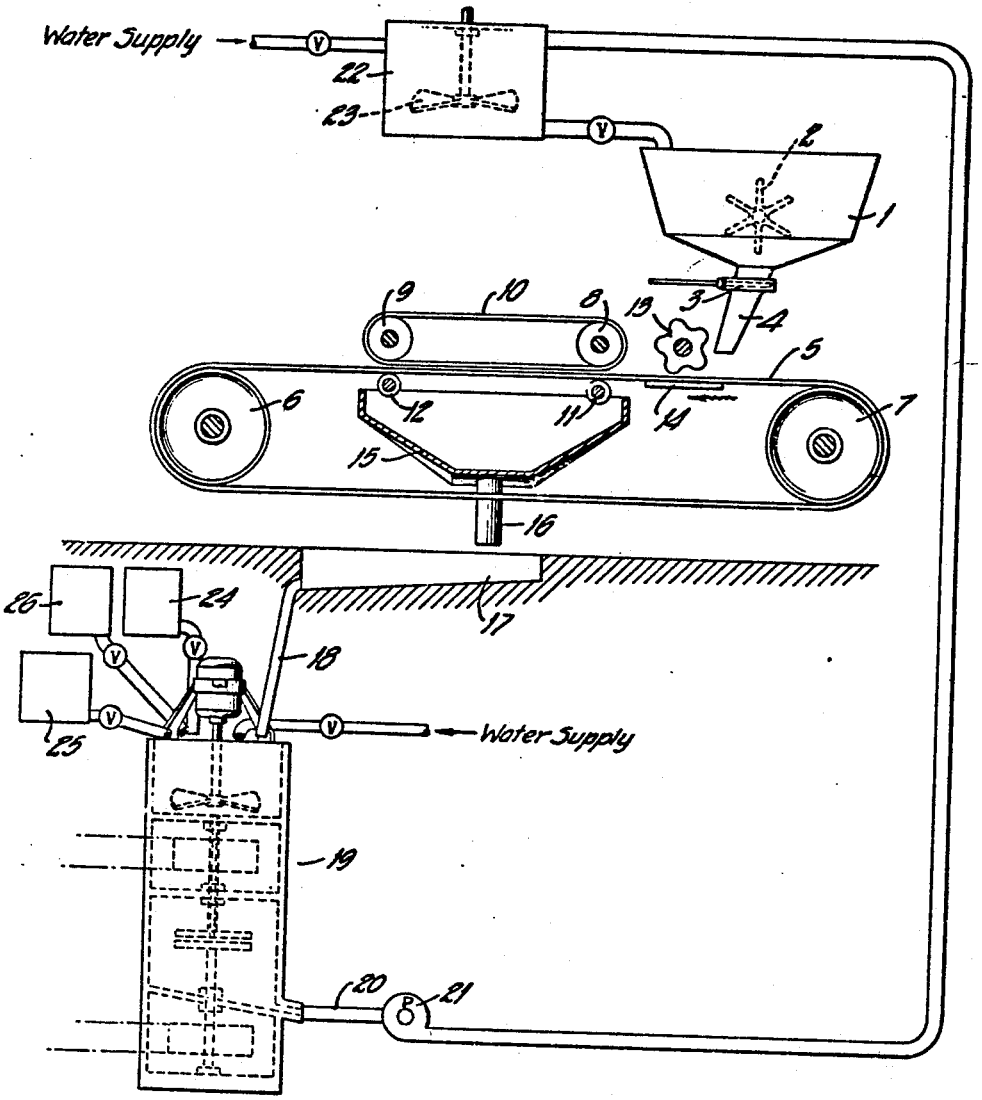

2,066,550

UNITED STATES PATENT OFFICE 2,066,550

METHOD OF MAKING PORTLAND CEMENT PRODUCTS

Clements Batcheller, Glens Falls, N. Y.

Application September 9, 1935, Serial No. 39,783

21 Claims. (Cl. 25—155)

My invention relates generally to products containing Portland cement as a bonding agent, and particularly to pressed products of this character which are formed from initially liquid or plastic mixes. More particularly it relates to a method of procedure whereby sheet products of the cement-asbestos type having improved physical characteristics may be economically manufactured.

Almost without exception, all cement-asbestos sheet and shingle products have heretofore been produced either by the dry-mix process of Charles L. Norton, or the highly fluid water mixture process of Ludwig Hatschek. Neither of these methods is entirely satisfactory.

Ordinarily, asbestos sheet and shingle products are composed of simple mixtures of Portland cement, mineral fibers and water, and the quality depends largely upon the correctness of the water mixing and the mechanical working of the cement constituent.

Those physical characteristics which indicate a satisfactory sheet asbestos product are high flexural strength, high impermeability as indicated by a high degree of water tightness, and a minimum of brittleness. At very best, cement-asbestos products of the above type can only be produced where the cement-fiber aggregate is worked, preferably as a plastic mixture, with a correctly established and maintained water cement ratio, and where the mechanical manipulation of the plastic mass is continued for a sufficient length of time.

In order that the importance of a correctly designed and worked water-cement plastic may be understood, so far as these factors control ultimate product quality, the water-cement ratio strength law is here quoted, to wit:

"For given materials and conditions of manipulation, the strength of concrete is determined solely by the ratio of the volume of the mixing water to the volume of cement, so long as the mixture is plastic and workable."

The first defect in the Hatschek process lies in the inability of the wet cylinder press to manipulate cement aggregate mixtures in any other than a highly fluid condition which results in excessive dilution and loss of the bonding glues. The second defect lies in the inability of the stock beater, which is the usual mixing means, to handle the partially gelatinized fluid mass in concentrations greater than a 10:1 water-solids ratio.

Due to excessive losses in the machine of the highly colloidal bonding glues in the cement, and the inability fully to replace and retain them in the product mass, the making of maximum strength products by this process is impossible.

In the Norton process, which is practically the reverse of the Hatschek process, the basic materials are initially mixed in the dry state with a limited amount of extraneous water added to the dry strip in the process of its machine formation. All the essential factors covering the premixing of a Portland cement concrete are ignored, and are in fact impossible due to the construction of the machine employed.

By the method of procedure disclosed herein, I am able to work mechanically the cement aggregate mixture as a plastic instead of the usual either highly fluid or initially dry mix. Furthermore, no appreciable loss of the bonding glues occurs and consequently full ultimate strength products can be made thereby. Not only is my improved process capable of making products which are substantially superior to the products made by the older processes but due to the more efficient manipulation of the basic materials I have also found that my process, with slight modifications, can produce super-strength products when compared with those heretofore regarded as standard. In addition, a great saving is effected not only in the quantity of basic materials required to produce a square of product but a considerable saving is effected in product transportation costs.

The bonding glues which result from the reaction between Portland cement and water are known chemically as gels, and these are highly colloidal compounds of calcium silicate and calcium aluminate. By my procedure the maximum quantity of these gels is retained in the plastic product mass and I am able to produce concrete products having physical characteristics superior to the best which can be produced from the unworked mixtures of the Norton process or the highly fluid mixtures of the Hatschek mixtures. Furthermore, by increasing the calcium silicate and the calcium aluminate contents of my plastic mixtures beyond the points usually indicated in the standard cement formulae I am able to produce an abnormally strong cement.

My process may conveniently be carried out by utilizing the apparatus diagrammatically illustrated in the drawing in which 1 is an elevated mixing unit into which the dry cement-aggregate mixture is introduced by any suitable means. Within this unit the cement and fibers are manipulated by a suitable agitator 2 at appropriate speed and for a sufficient length of time. The proper water cement ratio is established and constantly maintained in the unit 1 to produce optimum concrete according to the best known procedure. The gauging fluid, however, which is used to mix the concretes within the unit 1 does not consist entirely of water as is the universal custom. Instead, a highly colloidal mixture of by-products from my machine in a water-fluid state plus additions thereto which are later described, is employed. It is largely by reason of the additions to the usual gauging water that I am able to produce my super-strength products.

When the plastic mass in the unit 1 has been adequately mixed with the special gauging fluid, the slide valve 3 may be opened and the plastic mixture will flow by gravity downwardly through the discharge passage 4 and be deposited upon the top side of an endless porous belt 5. This belt is preferably a wire screen having about forty meshes to the linear inch.

The belt 5 runs over the rollers 6 and 7 and is driven in the direction of the arrow preferably by the roller 6. Above the porous belt 5 are one or more pressure rolls such as shown at 8 and 9 which are capable of proper vertical adjustment as a means of regulating the rolling pressure upon the plastic mass passing below them on the screen. Around these rollers may be installed, if desirable, an endless smooth rubber belt 10 to prevent any picking up of the plastic by the pressure rolls as it passes beneath them. Under each pressure roll is an appropriate backing roll shown at 11 and 12. Intermediate the first pressure roll 8 and the point where the plastic material is deposited on the screen from the mixing unit 1, I prefer to install a rough-forming roll 13 having corrugations running lengthwise thereof. Beneath this rough-forming roll is a backing plate 14.

As the plastic cement fiber mix is deposited upon the screen, it is first partially flattened by the rough-forming roll 13 and is thereafter reduced to the requisite thickness primarily by the roll 8 although the roll 9 may also serve in this capacity or it may serve merely as a means for driving roll 8.

In the rolling-pressing operation of the plastic mass there is an appreciable extraction of liquid material from the products being pressed, and naturally, the degree of extraction depends upon the amount of rolling pressure applied to the plastic mass.

In the wet-cylinder equipment typical of the machine used in the Hatschek process this liquid extraction would be termed "white water" and would contain a relatively low percentage of cement "fines" and an appreciable percentage of solubles from the cement. Such a condition would prevail because of the prolonged time (about one hour) of water mixing of the product materials in the drum beater which results in a high dissolution of the cement solubles, and because of the fact that the wool carrier belt typical of the wet-cylinder press is not sufficiently porous to permit the passage therethrough of any appreciable amount of cement "fines."

As distinguished from this procedure my base materials, as pointed out above, are mixed as a plastic rather than as a highly fluid mass; the mixing is for a much shorter time (about six minutes); and, due to the relatively high degree of porosity of my carrier belt 5, a large percentage of fine cement particles is extracted with the water as the products are roller-pressed. I find that the extracted materials from my products consist to a high degree of cement "fines" (200-300 mesh), combined with an appreciable percentage of cement particles which are much finer than 300 mesh, and very little of the cement solubles.

In other words, due to the relatively short time taken for the mixing of my plastic mass as compared with the Hatschek wet cylinder method, the percentage of cement solubles in my extracted fluid is very low and hence the products are not lacking in gel structure. However, it is important in the making of my super-strength products, that a maximum percentage of all material waste which is the result of machine fabrication be returned to the mix, but preferably, not until it has been further manipulated and fortified as hereinafter described. Below the belt 5, and within the zone where the fluid extracted from the pressed products passes through the belt, is disposed an appropriate receptacle 15 which discharges through a pipe 16 into a suitable trough 17. From the trough 17 the material flows through the pipe 18 into the unit represented generally at 19. Preferably, all of the by-products resulting from the trimming or other treatment of the plastic sheet produced by the machine are delivered, while plastic, to the unit 19 although it is to be understood that the trimmings may, if desired, be delivered directly to the mixing unit 1 before the cement has taken its initial set.

The unit 19 may consist of a modified colloid mill of the beater type or any high speed disintegrator mill capable of forming suitable dispersion-emulsions of the materials fed into it. The initial function of this unit is to create from the extracted waste products, consisting of fine cement particles and those portions of the cement that have gone into solution with the gauging water, as highly a gelatinized mass as is possible by rapidly working the materials within the unit, in combination with the additions thereto described below. The unit 19 discharges through the pipe 20, and in the embodiment shown, a centrifugal pump 21 is provided for returning the material eventually to the mixing unit 1. Instead of discharging the dispersed material directly into the mixer 1, it is delivered into a chest 22 which is equipped with a suitable agitator 23 to prevent any possible settling of the ingredients during their temporary storage here.

It is to be understood that the chest 22 is equipped with appropriate poidometer measuring units whereby the volume of the gauging fluid for each base mix of the cement aggregate in the mixer 1 may be regulated and controlled to establish and maintain therein the correct water cement ratio to produce optimum concrete products.

If my invention were to stop here with the incorporation in subsequent mixes of the cement "fines", solubles and other waste after they have been subjected to a dispersion treatment in the unit 19, I would obviously be able to effect in my product a higher retention of the essential bonding glues than by any manipulatory procedure of the prior art, due to a higher degree of gelatinization of the waste materials in the dispersion mill as compared with the usual and longer procedures characteristic of the drum beater.

It is a fact well known to those versed in the art of manipulating water-cement-fiber mixtures that prolonged mixing, such as is effected within the usual drum beater, will produce a semi-gelatinized effect upon the highly fluid mixture provided sufficient time is taken to produce this condition. In order to produce this effect it is the present custom to use a highly retarded cement to insure that an initial set will not take place before the product has been machine processed. Since my improved process is rapid and continuous, it is possible to overcome this defect in product mixing which is necessarily attendant upon the use of the drum beater.

I have found that a very rapid dispersion of the extracted and other waste cement-fiber materials, including those in solution, can be effected by the unit 19 if there is added to these materials, as a dispersing agent, a small quantity of bentonite; say from 1% to 3% of the total solids in the mixture delivered to the unit 19. Bentonite is a clay composed of exceedingly fine particles of colloidal or near-colloidal dimensions, which when dispersed in water, form suspensions that settle extremely slowly. When dry, it may absorb nearly five times its weight of water and swell up to thirteen times its dry bulk. It is not a definite mineral, but, depending on its purity, contains varying amounts of the mineral montmorillonite, a hydrous silicate of alumina, lime and magnesia, characterized by crystallization in minute flakes of micaceous form having a high degree of cleavage, and to which it owes its peculiar properties. The name, bentonite, was given many years ago to clay of this type from Rock Creek, Wyoming, and, more recently, various other place and trade names, such as, shoshonite, amargosite, otaylite, ardmorite, elconite, wilkinite, volclay, aquagel, etc., have been used to designate particular bentonite clays. Hence, the term bentonite, as used herein and in the appended claims, is to be understood as meaning any colloidal clay of the well known bentonitic type.

While my process of initially mixing and fabricating my cement aggregate mixtures as a plastic mass differs radically from all other processes or procedures at present employed, it will also be possible to produce a more rapid gelatinized condition in the usual highly fluid drum beater mixture of cement fibers by the addition thereto of the dispersing-emulsifying agent bentonite, and the customary mixing time thereby reduced some 50% or more. Hence, it is to be understood that my invention, insofar as this particular phase thereof is concerned, is by no means limited to the treatment of the cement-aggregate mix as a plastic mass.

An additionally important feature of my invention lies in the improved manner of liquid gauging my cement aggregate mixtures and in the preparation of the gauging liquid itself. While standard cement aggregate mixtures when gauged with clear water will produce products having satisfactory physical qualities according to the present standards, I have found that products having much better physical properties in all respects can be manufactured by substituting for clear water the highly colloidal, semi-gelatinized gauging fluid produced by my process with the added bentonite.

By a slight modification of the foregoing, I am able to produce a fortified "super" cement which is capable of producing products in many instances having a transverse strength practically double those produced by the prior art methods. For example, products made by the present processes and which show a modulus of rupture of 4,500 pounds per square inch are considered "satisfactory". On the other hand, products made by the use of the modified gauging liquid hereinafter described have shown a modulus of rupture better than 10,000 pounds per square inch.

Such extraordinarily strong products may be produced by the addition to the gauging fluid mixture of a limited quantity of special Portland cement of the type generally referred to as "early strength" cement. In cements of this type I prefer to use one of the "high alumina" type although cements of the "fine ground" type also answer my purpose.

My selection of such cements is in no sense due to the fact that they acquire a much earlier initial strength than do cements of standard formula, but because of the greater fineness of their cement particles, their higher degree of solubility, the facility with which they are suspended in water and their higher aluminum silicate content. These factors render them far more effective in producing a semi-gelatinization of the colloid mixture and, in addition, they form a better dispersion-emulsion with the bentonite which I use as a dispersing agent.

In utilizing early strength cement of the high alumina type in my gauging fluid above described, I prefer to feed the cement continuously into the unit 19 from a suitable container such as shown at 24. The flow from such container is so regulated that the added cement shall at no time greatly exceed about 3% of the solids in the fluid charge to the unit. That is to say, the added dry cement ought not to exceed approximately 3% of the total solids delivered to the unit 19 from the machine, plus the added bentonite which is also delivered continuously to the unit 19 from a suitable receptacle, such as that shown at 25.

In addition to the advantages above set forth, the use of "early strength" cements, due to the increased percentage of cement "fines", produce concrete of greater density and consequently higher structural strength than can be obtained by using the more coarsely ground standard cements.

While I have shown above that my process makes it possible to retain within the cement aggregate mixture a maximum of the cement's constituents whereby products of unusual strength are produced, I have found that my special gauging fluid, especially when fortified by the addition of the "early strength" cement, produces, in the case of roofing shingles for example, such a superhard product as seriously to alter certain of their physical properties, especially their flexibility. This superhard condition, where objectionable in certain types of products, can be prevented by taking advantage of some of the features disclosed in my copending application Serial No. 703,845, now Patent 2,041,041, particularly those which cover the integral mixing of small quantities of bituminous emulsion with a water plastic composition of mineral fibers and Portland cement. The addition to my gauging fluid of small percentages of asphalt emulsion, always less than 3% and preferably about 1%, will correct this superhard condition.

Any suitably prepared proprietary asphalt emulsion of which there are many on the market may be introduced into the unit 19 from an appropriate receptacle 26 at the same time that the "early strength" cement is added and thoroughly dispersed throughout the other ingredients charged into the unit. Preferably, however, I prefer to use an asphalt emulsion in which colloidal clay has been used as the dispersing agent by reason of the fact that the same agent is used in the preparation of the cement clay emulsion.

It is to be understood, of course, that the introduction of such small quantities of asphalt, initially, in the form of an emulsion as a means of effecting certain physical improvements in the products in no way detracts from the advantages otherwise obtained by my improved procedure.

While my process is substantially a continuous forming-pressing of the plastic sheet product from successive batch mixes of the plastic furnished by the unit 1, and I have stated that my product through the medium of a special gauging liquid contains those materials extracted from the plastic forming sheet under mechanical pressure, it is to be understood that when my process is placed in initial sheet production from the plastic of the first or initial batch mix that such sheet products as are formed from this initial mix must necessarily be devoid of any by-products from my machine. That is to say, the special gauging liquid produced by the unit 19 and used for gauging the initial batch mix will be devoid of any fluid or semi-fluid extractions from the product of the initial batch mix, and likewise of any plastic trim resulting from forming-pressing or side trimming of the product of the initial batch mix.

The liquid, and the solids, such as fine cement particles and mineral fibers, including those solids which have gone into solution, or are held in a water suspension, accumulating from the pressing-forming of the first batch mix, while absent from the products formed from the first batch mix, will be understood to be included in the gauging liquid of the second, and all successive batch mixes, through the medium of unit 19. Likewise all plastic trimmings resulting from the plastic sheet formation may be added to the second and successive batch mixes through unit 19, or they may be added directly to a batch mix in the unit 1 as outlined in my description.

While I have described my invention in its preferred embodiments, it is to be understood that the words which I have used are words of description rather than of limitation and that changes within the purview of the appended claims may be made without departing from the true scope and spirit of my invention in its broader aspects.

What I claim is:

1. That step in the method of making products from workable mixes containing Portland cement as a bonding agent which comprises incorporating in the mix a small quantity of colloidal clay as a dispersing agent.

2. That step in the method of making products from a workable mix containing Portland cement as a bonding agent which comprises subjecting a liquid mixture of the cement to a dispersive treatment in the presence of a dispersing agent.

3. Those steps in the method of making pressed products from plastic mixes containing Portland cement which comprise subjecting said products while plastic to pressure sufficient to effect an extraction of material therefrom, segregating the material extracted from said products during the pressing thereof, incorporating Portland cement and a small quantity of colloidal clay therewith, subjecting the mixture to a dispersive treatment, and incorporating the treated material in subsequent mixes.

4. Those steps in the method of making pressed sheet products from plastic mixes containing Portland cement as a bonding agent which comprise subjecting said products while plastic to pressure sufficient to effect an extraction of material therefrom, segregating the material extracted from said products during the pressing thereof, adding thereto a small quantity of Portland cement, subjecting the mixture to a dispersive treatment, and incorporating the treated material in subsequent mixes.

5. Those steps in the method of making pressed sheet products from plastic mixes containing Portland cement as a bonding agent which comprise subjecting said products while plastic to pressure sufficient to effect an extraction of material therefrom, segregating the material extracted from said products during the pressing thereof, adding thereto a small quantity of asphalt emulsion, subjecting the mixture to a dispersive treatment, and incorporating the treated material in subsequent mixes.

6. Those steps in the method of making pressed sheet products from plastic mixes containing Portland cement as a bonding agent which comprise subjecting said products while plastic to pressure sufficient to effect an extraction of material therefrom, segregating the material extracted from said products during the pressing thereof, adding thereto small quantities of asphalt emulsion and Portland cement, subjecting the mixture to a dispersive treatment, and incorporating the treated material in subsequent mixes.

7. Those steps in the method of making pressed sheet products from plastic mixes containing Portland cement as a bonding agent which comprise subjecting said products while plastic to pressure sufficient to effect an extraction of material therefrom, segregating the material extracted from said products during the pressing thereof, adding thereto small quantities of asphalt emulsion and colloidal clay, subjecting the mixture to a dispersive treatment, and incorporating the treated material in subsequent mixes.

8. Those steps in the method of making pressed sheet products from plastic mixes containing Portland cement as a bonding agent which comprise subjecting said products while plastic to pressure sufficient to effect an extraction of material therefrom, segregating the material extracted from said products during the pressing thereof, adding thereto small quantities of Portland cement, colloidal clay and asphalt emulsion, subjecting the mixture to a dispersive treatment, and incorporating the material in subsequent mixes.

9. That step in the manufacture of products from plastic mixes containing Portland cement as a bonding agent which comprises incorporating in the gauging liquid for said mixes a dispersion-emulsion of Portland cement.

10. Those steps in the making of pressed products from plastic mixes containing Portland cement as a bonding agent which comprise rough forming said products by pressure sufficient to extract material therefrom, subjecting the material extracted from said products during the pressing operation to a dispersive treatment, and incorporating the treated material together with the waste solid material from said products while plastic in subsequent mixes.

11. That step in the making of cement-asbestos sheet products which comprises intermixing the ingredients to be used in making said products in the presence of a dispersing-emulsifying agent.

12. Those steps in the method of making pressed products from water plastic mixes containing Portland cement which comprise subjecting said products while plastic to pressure sufficient to effect an extraction of fluent material therefrom, and incorporating the extracted material in subsequently formed products.

13. Those steps in the making of pressed products from plastic mixes containing Portland cement which comprise subjecting said products while plastic to pressure sufficient to effect an extraction of material therefrom, subjecting said material to a dispersive treatment, and thereafter incorporating it in subsequently formed products.

14. Those steps in the making of pressed products from workable mixes containing Portland cement which comprise segregating the waste materials resulting from the formation of said products, subjecting them to a dispersive treatment, and thereafter incorporating them in subsequently formed products.

15. Those steps in the method of making pressed products from water plastic mixes containing Portland cement which comprise subjecting said products while plastic to pressure sufficient to effect an extraction of fluent material therefrom and incorporating the extracted fluent material in the gauging liquid for subsequent mixes.

16. That step in the method of making sheet products from a workable mixture containing Portland cement which comprises subjecting a mixture of the cement and water to a dispersing-emulsifying treatment in the presence of bentonite.

17. Those steps in the method of making pressed products from plastic mixes containing Portland cement which comprise forming the gauging liquid for said mixes by intermixing Portland cement, water, a small quantity of bentonite and a small quantity of asphalt emulsion and subjecting the mixture to a dispersive treatment.

18. Those steps in the method of making pressed products from plastic mixes containing Portland cement which comprise forming the gauging liquid for said mixes by intermixing Portland cement, water, and a small quantity of bentonite and subjecting the mixture to a dispersive treatment.

19. Those steps in the method of making pressed sheet products from plastic mixes containing Portland cement as a bonding agent which comprise subjecting said products while plastic to pressure sufficient to effect an extraction of material therefrom, segregating the material extracted from said products during the initial pressing thereof, trimming the edges of said products while plastic, subjecting said extracted material together with the unset plastic trimmings from said products to a dispersive treatment and incorporating the product of the treatment in subsequent mixes.

20. Those steps in the method of making pressed sheet products from plastic mixes containing Portland cement as a bonding agent which comprise subjecting said products while plastic to pressure sufficient to effect an extraction of material therefrom, segregating the material extracted from said products during the initial pressing thereof, trimming the edges of said products while plastic, subjecting said extracted material together with the unset plastic trimmings from said products to a dispersive treatment in the presence of bentonite, and incorporating the material so treated in subsequent mixes.

21. Those steps in the making of pressed products from water plastic mixes containing Portland cement and asbestos fibers which comprise subjecting said products while plastic to pressure sufficient to extract fluent material therefrom, and incorporating said fluent material in subsequently formed products.

CLEMENTS BATCHELLER.